(12) United States Patent
Mahieu

(10) Patent No.: US 11,530,161 B2
(45) Date of Patent: Dec. 20, 2022

(54) REFLECTIVE PANEL

(71) Applicant: AGC GLASS EUROPE, Louvain-la-Neuve (BE)

(72) Inventor: Stijn Mahieu, Lovendegem (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 729 days.

(21) Appl. No.: 16/064,913

(22) PCT Filed: Dec. 1, 2016

(86) PCT No.: PCT/EP2016/079446
§ 371 (c)(1),
(2) Date: Jun. 21, 2018

(87) PCT Pub. No.: WO2017/108366
PCT Pub. Date: Jun. 29, 2017

(65) Prior Publication Data
US 2019/0002341 A1    Jan. 3, 2019

(30) Foreign Application Priority Data
Dec. 22, 2015 (EP) .................................. 15201948

(51) Int. Cl.
*C03C 17/36* (2006.01)
(52) U.S. Cl.
CPC .......... *C03C 17/3663* (2013.01); *C03C 17/36* (2013.01); *C03C 17/3607* (2013.01);
(Continued)

(58) Field of Classification Search
CPC ............ C03C 17/3618; C03C 2217/26; C03C 17/3607; C03C 17/3649; C03C 2217/734;
(Continued)

(56) References Cited

U.S. PATENT DOCUMENTS 2,519,545 A * 8/1950 Colbert .................... G02B 1/10
359/584
2,519,722 A * 8/1950 Turner ................. G02B 5/0858
359/585

(Continued)

FOREIGN PATENT DOCUMENTS

DE     42 43 930 A1    6/1993
EP     0 456 488 A1    11/1991
(Continued)

OTHER PUBLICATIONS

Dobrowolski, Chapter 42. Optical Properties of Films and Coatings, Handbook of Optics, vol. I Fundamentals, Techniques and Design, Second Edition, McGraw-Hill, Inc., 1995, pp. 42.3-42.19, 42.34-42.54, 42.94-42.98, 42.101-42.108. (Year: 1995).*
(Continued)

*Primary Examiner* — Monique R Jackson
(74) *Attorney, Agent, or Firm* — Oblon, McClelland, Maier & Neustadt, L.L.P.

(57) ABSTRACT

The invention concerns reflective opaque panels that can be used as facing panels or decorative panels. They consist of a substrate coated with a stack of layers comprising, in the following order, at least (i) a transparent substrate (S), (ii) a first dielectric layer which is a high refractive index dielectric layer (H1), (iii) a second dielectric layer which is a low refractive index dielectric layer (L1), and (vi) a single chromium-based layer.

18 Claims, 2 Drawing Sheets

(52) U.S. Cl.
CPC ...... *C03C 17/3618* (2013.01); *C03C 17/3636* (2013.01); *C03C 17/3642* (2013.01); *C03C 17/3649* (2013.01); *C03C 17/3684* (2013.01); *C03C 2217/213* (2013.01); *C03C 2217/23* (2013.01); *C03C 2217/26* (2013.01); *C03C 2217/72* (2013.01); *C03C 2217/734* (2013.01); *C03C 2218/156* (2013.01)

(58) Field of Classification Search
CPC .............. C03C 2217/23; G02B 5/0858; G02B 5/0866
See application file for complete search history.

(56) References Cited

U.S. PATENT DOCUMENTS

| | | | | |
|---|---|---|---|---|
| 4,900,630 | A * | 2/1990 | Suzuki | C03C 17/36 428/432 |
| 4,955,705 | A * | 9/1990 | Nakajima | G02B 5/0858 359/603 |
| 5,745,291 | A * | 4/1998 | Jenkinson | G02B 5/0833 359/586 |
| 7,153,595 | B2 * | 12/2006 | Schicht | C03C 17/36 428/701 |
| 9,452,950 | B2 * | 9/2016 | Mahieu | C03C 17/3663 |
| 2006/0209566 | A1 * | 9/2006 | Koike | F21V 7/28 362/623 |

FOREIGN PATENT DOCUMENTS

| | | | | |
|---|---|---|---|---|
| JP | 60212705 A | * | 10/1985 | ........... G02B 5/0858 |
| WO | WO-2014001275 A1 | * | 1/2014 | ............. C03C 17/36 |

OTHER PUBLICATIONS

Machine translation of JP60-212705A, published Oct. 1985, Powered by EPO and Google. (Year: 1985).*

International Search Report dated Jan. 19, 2017, in PCT/EP2016/079446 filed Dec. 1, 2016.

* cited by examiner

REFLECTIVE PANEL

BACKGROUND

The present invention relates to reflective panels in particular consisting of a substrate coated with a stack of layers. More particularly, the invention relates to a glazing panel comprising a stack of layers of reflective and opaque aspect able to be thermally tempered, i.e. able to withstand heat treatments such as thermal tempering, bending and annealing without notable degradation of the properties of the final product.

Reflective panels according to the invention may have various applications. They may be used as reflective decorative or cladding panels, in interior or exterior applications such as elements of shelves, cupboards, doors, wall coatings, ceilings, stands, glazed tables, wall lamps, partitions, store fronts, façade panels, spandrels, in furnishings, wardrobes or bathrooms, in swimming pools or spas, in make-up cases or compacts or in the automotive industry as vehicle rear-view mirrors for example. Such applications may require thermally tempered glazing units for reasons of safety and to increase flexural strength and shock resistance.

Generally, in a good number of these applications, it is silver-based mirrors that are used, often produced by wet chemical processes. In these processes, a silver layer is deposited by reduction reaction of an ammoniacal silver nitrate solution on a flat or curved glass sheet. This silver layer is then covered with a protective copper layer or treated with a passivating solution. Next, one or more coats of paint are deposited in order to produce the final mirror. These various elements ensure that the mirror ages acceptably and has a satisfactory mechanical strength and corrosion resistance. Such mirrors are for example described in document FR 2719839. For an application requiring a tempered mirror, the wet deposition must be carried out on an already tempered glass pane of set size. Furthermore some applications, in particular decorative applications require high reflectance on both sides of a glazing panel. With mirrors having only one high reflectance side, such as for example traditional silver mirrors, this requires assembling two mirrors back to back, which is expensive and leads to heavier mirrors.

EP 962429 describes a glazing unit comprising a stack of layers of reflective metallic aspect and able to withstand heat treatments, said stack being deposited by cathode sputtering. It comprises a dielectric base layer (made of $SiO_2$, $Al_2O_3$, SiON, $Si_3N_4$ or AlN), a highly reflective essentially metal layer (based on Cr, an alloy containing Cr or an alloy containing Al) and an exterior covering layer made of a dielectric ($Si_3N_4$, AlN). The glazing units according to EP 962429 have a glass-side light reflectance (RLv) higher than 50% and a light transmission (TL) of 2 to 15% and preferably from 4 to 10%. To manufacture opaque glazing units for use as spandrels, EP 962429 teaches applying an additional colored layer (for example made of enamel) on the stack of layers described above.

BRIEF SUMMARY

According to one of its aspects, the subject of the present invention is a coated substrate coated with a stack of layers comprising, in order, at least:
i. a transparent substrate (S);
ii. a first dielectric layer which is a high refractive index dielectric layer (H1);
iii. a second dielectric layer which is a low refractive index dielectric layer (L1); and
iv. a single chromium-based layer (C),
the coated substrate having a light transmission of at most 2%.

DETAILED DESCRIPTION

The invention relates to a substrate coated with a stack of layers comprising, in order, at least
i. a transparent substrate (S);
ii. a first dielectric layer which is a high refractive index dielectric layer (H1);
iii. second dielectric layer which is a low refractive index dielectric layer (L1); and
iv. a single chromium-based layer.

Such coated substrates, by virtue of at least this specific trio of H1/L1/chromium-based layers, have the advantage of providing panels that:
are reflective, having a glass-side light reflectance RLv>50% and preferably >60%, more preferably >70% and a coating-side reflectance RLc >40%, preferably >45%, more preferably >50%
are opaque, having a light transmission TL≤2%, preferably ≤1% and more preferably ≤0.5%;
are of neutral aspect in glass-side reflection (CIELAB values −5<a*<5, preferably −3<a*<3 and −6<b*<6 and preferably −4<b*<4 under illuminant D65);
are resistant to customary chemical durability tests (CASS test, neutral salt spray test, condensation test, environmental chamber testing, Cleveland test);
are obtained by a more environmentally friendly process (cathode sputtering process or PECVD in comparison to a wet process);
do not require a, generally expensive, layer of paint or enamel and avoid using lead, which is conventionally present in the paints used for mirrors;
do not require more than a single chromium-based layer; and
require at most two dielectric layers having a high refractive index which are known to have low deposition rates.

Figure 1:
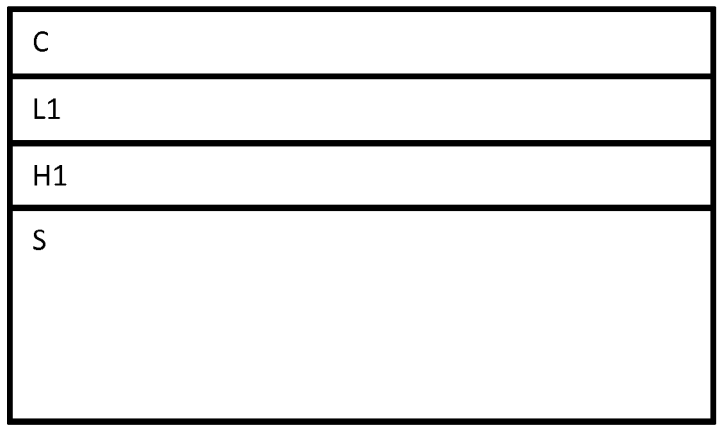
FIG. 1 shows a substrate coated with a stack of layers according to the present invention. (not to scale)

FIG. 1 shows a substrate (S) coated with a first dielectric layer (H1) which is a high refractive index layer. A second dielectric layer (L1) which is a low refractive index layer is present on the first dielectric layer (H1) and a single chromium-based layer (C) is present on the second dielectric layer (L2).

The transparent substrate (S) according to the invention is preferably a glazing substrate, for example a float glass, soda-lime, clear, colored or extra-clear (i.e. having lower Fe content and higher transmittance) substrates possibly having a thickness typically comprised between 2 and 12 mm. However, the invention may also apply to plastic substrates, for example made of PMMA. It is necessary for the substrate to be transparent because, when such a panel is used, the light passes a first time through the substrate, is reflected from the stack of layers according to the invention and then passes a second time through the substrate. A user looking at his or her image in a reflective panel according to the invention is therefore facing the "substrate" side of the panel, the stack of layers being located on the other face of the substrate, i.e. that opposite the user.

The expression "chromium-based layer" is understood to mean a layer comprising at least 50% by weight chromium, preferably at least 60%, at least 70% or at least 80% and even more preferably comprising at least 90% by weight chromium or at least 95%. Advantageously, the chromium-based layers essentially consist of chromium, i.e. they consist of chromium that may nonetheless contain other minor components provided that the latter do not affect the essential properties of the basic composition. The expression "single chromium-based layer" does not exclude that the layer may be deposited in more than one step, for example in two or more consecutive sputtering deposition steps. In a preferred embodiment the "chromium-based layer" comprises less than 50% by weight of nickel, more preferably less than 40% by weight of nickel, more preferably less than 30% by weight of nickel, more preferably less than 20% by weight of nickel, more preferably less than 10% by weight of nickel. In another preferred embodiment the "chromium-based layer" comprises no nickel. Indeed it was observed that lower nickel contents increase the chemical durability the layer stacks of the present invention.

In an embodiment of the present invention the substrate is coated with a stack of layers comprising, in order, at least
  i. a transparent substrate (S);
  ii. a first dielectric layer which is a high refractive index dielectric layer (H1);
  iii. a second dielectric layer which is a low refractive index dielectric layer (L1);
  iv. a third dielectric layer which is a high refractive index dielectric layer (H2); and
  v. a single chromium-based layer.

Figure 2:
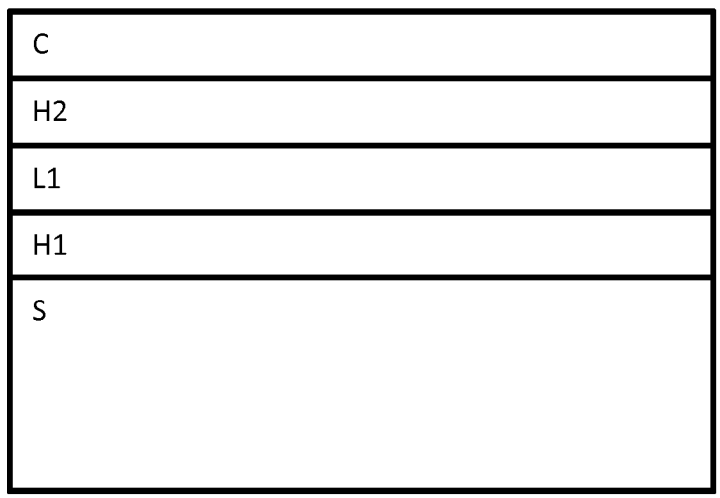
FIG. 2 shows another substrate coated with a stack of layers according to the present invention.

FIG. 2 shows a substrate (S) coated with a first dielectric layer (H1) which is a high refractive index layer. A second dielectric layer (L1) which is a low refractive index layer is present on the first dielectric layer (H1) and a third dielectric layer (H2) which is a high refractive index layer is present on the second dielectric layer (L1). A single chromium-based layer (C) is present on the third dielectric layer (H2).

In another embodiment of the present invention the substrate is coated with a stack of layers comprising, in order, at least
  i. a transparent substrate (S);
  ii. a first dielectric layer which is a high refractive index dielectric layer (H1);
  iii. a second dielectric layer which is a low refractive index dielectric layer (L1);
  iv. a third dielectric layer which is a high refractive index dielectric layer (H2); and
  v. a fourth dielectric layer which is a low refractive index dielectric layer (L2); and
  vi. a single chromium-based layer.

Figure 3:
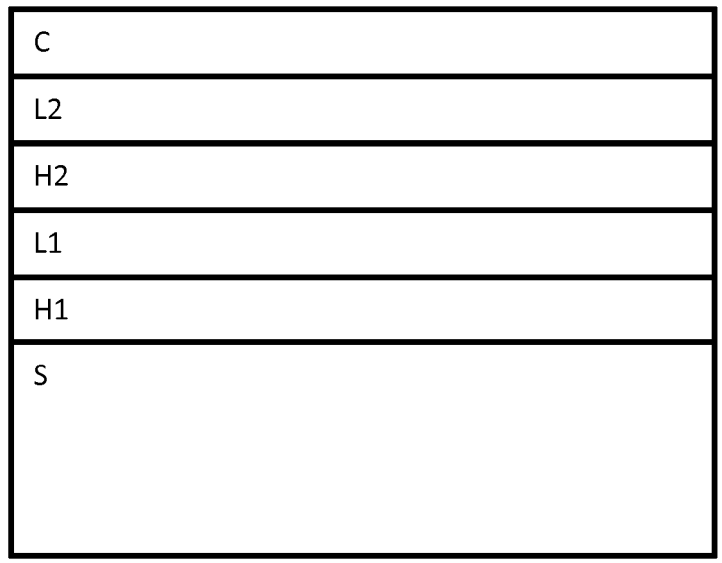
FIG. 3 shows another substrate coated with a stack of layers according to the present invention.

FIG. 3 shows a substrate (S) coated with a first dielectric layer (H1) which is a high refractive index layer. A second dielectric layer (L1) which is a low refractive index layer is present on the first dielectric layer (H1) and a third dielectric layer (H2) which is a high refractive index layer is present on the second dielectric layer. A fourth dielectric layer (L2) which is a low refractive index layer is present on the third dielectric layer (H2) and a single chromium-based layer (C) is present on the fourth dielectric layer (H2).

Advantageously, the high refractive index dielectric layer(s) (H1, H2) according to the invention comprise(s), or more preferably, essentially consist(s) of, a material having an absorption coefficient k at a wavelength of 550 nm lower than 0.1, and a refractive index n at a wavelength of 550 nm comprised between 2.1 and 2.8. The high refractive index layers (H1, H2) may have differing compositions. Preferably, the high refractive index dielectric layer(s) (H1, H2) comprise(s), or essentially consist(s) of, a material chosen from titanium oxides, zirconium oxides, niobium oxides, hafnium oxides, bismuth oxides and mixtures of at least two thereof. Oxides of Zr, Nb or Ti and mixtures of at least two thereof are generally preferred for their particular resistance to heat treatments. More preferably, the high refractive index dielectric layer(s) (H1, H2) essentially consist(s) of $Ti_xZr_yO_z$. $Ti_xZr_yO_z$ (TZO) is a mixed oxide of titanium and zirconium, comprising at least 35% by weight of titanium oxide, preferably at least 40% by weight of titanium oxide, more preferably at least 50% of titanium oxide. The expression "layer essentially consisting of $Ti_xZr_yO_z$" is also understood to encompass layers doped with at least one other element and containing up to at most about 10% by weight of this at least one other element, said doped layers having dielectric properties that are practically no different from those of pure $Ti_xZr_yO_z$ layers (for example, layers deposited by cathode sputtering processes using a TiZr target containing up to 10% by weight Al). The high refractive index dielectric layer(s) (H1, H2) according to the invention may furthermore consist of a plurality of individual sublayers comprising or essentially consisting of the above materials. In this case the individual sublayers need not be of exactly the same composition.

Advantageously, the low refractive index dielectric layer(s) (L1, L2) according to the invention comprise(s), or more preferably, essentially consist of, a material having an absorption coefficient k at a wavelength of 550 nm lower than 0.1, and a refractive index n at a wavelength of 550 nm lower than 1.9, preferably lower than 1.8, more preferably comprised between 1.4 and 1.8. The low refractive index dielectric layers (L1, L2) may have differing compositions. Preferably, the low refractive index dielectric layer(s) (L1, L2) comprise(s), or essentially consist(s) of, a material chosen from silicon oxides, aluminum oxides and mixtures of at least two thereof. Oxides of silicon are generally preferred for their particular resistance to heat treatments. More preferably, the low refractive index dielectric layer(s) (L1, L2) essentially consist of silicon oxide ($SiO_x$, with x comprised between 1.6 and 2.1). The expression "layer essentially consisting of oxides of silicon" is also understood to encompass layers doped with at least one other element and containing up to at most about 10% by weight of this at least one other element, said doped layers having dielectric properties that are practically no different from those of pure silicon oxide layers (for example, layers deposited by cathode sputtering processes using a SiAl target containing up to 10% by weight Al). The low refractive index dielectric layer(s) (L1, L2) according to the invention may furthermore consist of a plurality of individual sublayers comprising or essentially consisting of the above materials. In this case the individual sublayers need not be of exactly the same composition.

The geometric thickness of the single chromium-based layer (C) is preferably at least 15 nm or at least 20 nm and more preferably at least 25 nm; it is preferably at most 70 nm or at most 50 nm and more preferably at most 40 nm. The main function of the single chromium-based layer (C) is reflection and absorption and such thicknesses are particularly well suited to this function, in addition to satisfying the other properties of the panel according to the invention. The chromium-based layer (C) according to the invention may furthermore consist of a plurality of individual layers comprising or essentially consisting of the above materials. According to the present invention the single chromium-based layer (C) is the only metal layer present in the layer stack. This does not exclude that the single chromium-based layer (C) is formed in more than one step, for example by at least two consecutive sputtering steps.

Advantageously the optical thickness of the first dielectric layer (H1) is at least 100 nm or preferably at least 110 nm and more preferably at least 120 nm; it is at most 300 nm or preferably at most 280 nm and more preferably at most 260 nm. It will be recalled that the optical thickness of a layer is the product of the geometric thickness of the layer and the refractive index (at a wavelength of 550 nm) of the material forming the layer. The main function of the first dielectric layer (H1) of the present invention is to increase the reflection already obtained with the single chromium-based layer and to adjust color and therefore color neutrality; such thicknesses are particularly well suited to this function, in addition to satisfying the other properties of the panel according to the invention. If the first dielectric layer (H1) consists of a plurality of sublayers, the optical thickness of the first dielectric layer (H1) is equal to the sum of the optical thicknesses of these individual sublayers. In the preferred case of a first dielectric layer (H1) essentially consisting of $TiO_2$ or $Ti_xZr_yO_z$, the geometric thickness of the latter is preferably comprised between 50 and 150 nm and more preferably between 60 and 125 nm.

Advantageously the optical thickness of the second dielectric layer (L1) is at least 70 nm or preferably at least 80 nm and more preferably at least 95 nm; it is at most 200 nm or preferably at most 180 nm and more preferably at most 160 nm. If the second dielectric layer (L1) consists of a plurality of sublayers, the optical thickness of the dielectric layer is equal to the sum of the optical thicknesses of these individual sublayers. In the preferred case of the second dielectric layer essentially consisting of $SiO_x$ or $SiAlO_x$, the geometric thickness of the latter is preferably comprised between 50 and 120 nm and more preferably between 55 and 110 nm, most preferably between 55 and 70 nm. $SiAlO_x$ denotes a mixed oxide of silicon and aluminum comprising $SiO_2$ and $Al_2O_3$ sputtered from a metallic SiAl target comprising up to 10% in weight of aluminum.

In certain embodiments of the invention, the stack of layers comprises the a third dielectric layer which is a high refractive index dielectric layer (H2). The third dielectric layer (H2) is deposited on the second dielectric layer (L1) and is situated below the single chromium-based layer. The third dielectric layer (H2) which is a high refractive index layer is thus in between the second dielectric layer (L1) and the single chromium-based layer (C).

Advantageously the optical thickness of the third dielectric layer (H2) is at least 90 nm or preferably at least 110 nm and more preferably at least 120 nm; it is at most 250 nm or preferably at most 230 nm and more preferably at most 180 nm. The main functions of the third dielectric layer (H2) in the present invention are to further increase the reflection already obtained with the trio of H1/L1/chromium-based layers (that is: first dielectric/second dielectric/single chromium-based layers) and to maintain color neutrality; such thicknesses are particularly well suited to this function, in addition to satisfying the other properties of the panel according to the invention. If the third dielectric layer (H2) consists of a plurality of sublayers, the optical thickness of the dielectric layer is equal to the sum of the optical thicknesses of these individual sublayers. In the preferred case of a dielectric layer essentially consisting of $TiO_2$ or $Ti_xZr_yO_z$, the geometric thickness of the latter is preferably comprised between 40 and 120 nm and more preferably between 45 and 115 nm.

In certain preferred embodiments of the invention the optical thickness of the third dielectric layer (H2) is not more than 95% of the optical thickness of the first dielectric layer (H1).

In certain embodiments of the invention, the stack of layers comprises the a third dielectric layer which is a high refractive index dielectric layer (H2). The third dielectric layer (H2) is deposited on the second dielectric layer (L1). This embodiment further comprises a fourth dielectric layer which is a low refractive index dielectric layer (L2). The fourth dielectric layer (L2) is deposited on the third dielectric layer and is situated below the single chromium-based layer. The fourth dielectric layer (L2) which is a low refractive index dielectric layer is thus in between the third dielectric layer (H2) and the single chromium-based layer (C).

Advantageously the optical thickness of the fourth dielectric layer (L2) is at least 90 nm or preferably at least 100 nm and more preferably at least 110 nm; it is at most 200 nm or preferably at most 180 nm and more preferably at most 160 nm. The main functions of the fourth dielectric layer (L2) in the present invention is to further increase the reflection already obtained with the single chromium-based layer and the first, second and third dielectric layers and to maintain color neutrality; such thicknesses are particularly well suited to this function, in addition to satisfying the other properties of the panel according to the invention. If the fourth dielectric layer (L2) consists of a plurality of sublayers, the optical thickness of the fourth dielectric layer (L2) is equal to the sum of the optical thicknesses of these individual sublayers. In the preferred case of a fourth dielectric layer (L2) essentially consisting of $SiO_2$ or $SiAlO_x$, the geometric thickness of the latter is preferably comprised between 50 and 100 nm and more preferably between 60 and 90 nm.

Figure 4:
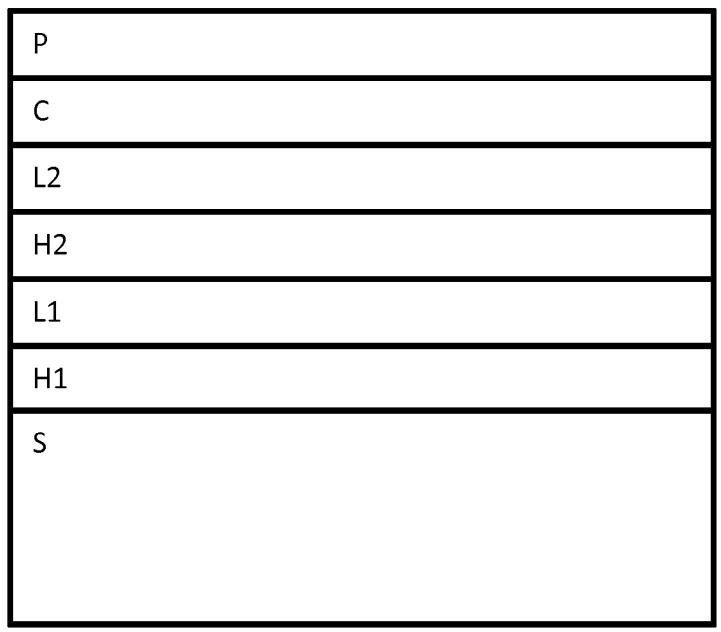
FIG. 4 shows another substrate coated with a stack of layers according to the present invention.

In certain forms of the invention, the stack of layers furthermore comprises, by way of last layer of the stack (side opposite the substrate), a protective layer (P). This layer provides the coated panel with additional mechanical protection during handling and also limits the variation of the layer stack's optical properties upon heat treatment, such as thermal tempering. Such coated substrate, by virtue of this additional protective layer have the advantage of providing panels that are:

reflective, having a glass-side light reflectance RLv>50% and preferably >60%, more preferably >70% and a coating-side reflectance RLc >40%, preferably >45%, more preferably >50%, both without having undergone a heat treatment and after heat treatment;

opaque, having a light transmission TL≤2%, preferably ≤1% and more preferably ≤0.5%;

able to be used both without having undergone a heat treatment and after heat treatment;

of neutral aspect in glass-side reflection (−5<a*<5, preferably −3<a*<3 and −6<b*<6 and preferably −4<b*<4 under illuminant D65);

FIG. 4 shows a substrate (S) coated with a first dielectric layer (H1) which is a high refractive index layer. A second dielectric layer (L1) which is a low refractive index layer is present on the first dielectric layer (H1) and a third dielectric layer (H2) which is a high refractive index layer is present on the second dielectric layer. A fourth dielectric layer (L2)

which is a low refractive index layer is present on the third dielectric layer (H2) and a single chromium-based layer (C) is present on the fourth dielectric layer (H2). The last layer of the stack, on the chromium-based layer, is the protective layer (P).

Preferably, the protective layer (P) comprises, or essentially consists of, a material chosen from silicon oxides, aluminum oxides, silicon nitrides, aluminum nitrides and mixtures thereof. Oxides or nitrides of silicon or aluminum are generally preferred for their particular resistance to heat treatments. More preferably, the protective layer (P) essentially consists of silicon nitride or silicon oxide. The expressions "layer essentially consisting of silicon nitride" and "layer essentially consisting of silicon oxide" are also understood to encompass layers doped with at least one other element and containing up to at most about 10% by weight of this at least one other element, said doped layers having dielectric properties that are practically no different from those of pure silicon nitride or silicon oxide layers (for example, layers deposited by cathode sputtering processes using a silicon target containing up to 10% by weight aluminum). The protective layer (P) preferably has a geometric thickness comprised between 5 and 40 nm, more preferably between 10 and 30 nm.

In other embodiments of the invention, other layers may be present: whether on the substrate, on the face opposite that carrying the stack of layers according to the invention (for example an antireflection layer), or between the substrate and the first dielectric layer (for example a barrier layer), or even between the single chromium layer and the optional protective layer (for example a layer improving scratch resistance), provided that these layers do not degrade the aforementioned properties of the invention.

Advantageously the coated substrates according to the invention have a glass-side light reflectance)(RLv-D65-2° of at least 40% or at least 50%, preferably of at least 60% and even of at least 65% or at least 70%, before and after the optional heat treatment. Their light transmission (TL-D65) is at most 2% or at most 1% and preferably at most than 0.5%, preferably both before and after the optional heat treatment. Their coating-side reflectance)(RLc-D65-2° is preferably at least 40%, more preferably >45%, even more preferably >50%.

Advantageously the coated substrates according to the invention furthermore have a neutral tint when they are examined in reflection from the glass side, i.e. their a* and b* values (CIELAB L*a*b*values-D65-2° are such that −5<a*<5 and −6<b*<6 and preferably −3<a*<3 and −4<b*<4.

In an embodiment of the present invention the layer first dielectric layer (H1) is in direct contact with the transparent substrate (S).

In a preferred embodiment of the present invention, the first dielectric layer (H1) is in direct contact with the second dielectric layer (L1).

In another preferred embodiment of the present invention, the second dielectric layer (L1) is in direct contact with the single chromium-based layer (C).

In another preferred embodiment of the present invention, the second dielectric layer (L1) is in direct contact with the third dielectric layer (H2).

In another preferred embodiment of the present invention, the third dielectric layer (H2) is in direct contact with the single chromium-based layer (C).

In another preferred embodiment of the present invention, the third dielectric layer (H2) is in direct contact with the fourth dielectric layer (L2). In another preferred embodiment of the present invention, the fourth dielectric layer (L2) is in direct contact with the single chromium-based layer (C).

The coated substrates according to the invention are resistant to customary chemical durability tests: Thus they resist, i.e. they pass comply with the acceptance criteria for edge corrosion and spot faults, both before and after the optional heat treatment:
  the copper accelerated acetic acid salt spray test (CASS) according to standard ISO 9227-2006, preferably for at least 5 days;
  the neutral salt spray (NSS) test according to standard EN 1096-2:2001, preferably for at least 20 days;
  the condensation water test (COND) according to standard EN 1036-2008, preferably for at least 20 days;
  the continuous condensation test (Cleveland test, CLEV) according to standard ISO 6270-1: 1998, preferably for at least 15 days.

Preferably, they are, both before and after the optional heat treatment, compatible with and therefore chemically resistant to the adhesives customarily used to fasten the panels to a support (for example: alkoxy adhesives and acetic adhesives).

Advantageously, they also have a good mechanical durability and are, both before and after the optional heat treatment, resistant:
  to the dry brush test (DBT) according to standard ASTM D2486-00 (test method "A"), preferably for at least 1000 cycles; and
  to the felt test (FT) according to standard EN1096-2: 2001, preferably for at least 500 cycles.

Coated glass samples are deemed resistant to the DBT and FT tests when no visible scratches can be observed after the test. The samples are examined in reflection under an artificial sky as described in EN 1096-1:2012 chapters 8.2 and 8.3, but at a distance of 1 m from the coated substrate.

The layers according to the invention are advantageously deposited on the substrate by a physical vapor deposition (PVD) system, for example by magnetron reactive vacuum cathode sputtering.

In a preferred embodiment of the present invention the layers according to the invention are deposited by Plasma Enhanced Chemical Vapor Deposition (PECVD). With PECVD higher deposition rates may be obtained.

Particular embodiments of the invention will now be described by way of example. Optical properties were measured under illuminant D65.

EXAMPLES

On an industrial vacuum coating line normal clear soda-lime float glass substrates of about 4 mm in thickness were coated by magnetron cathode sputtering with different stacks of layers, forming coated substrates shown below. The TZO ($Ti_xZr_yO_z$) layers in these examples consist of a mixed oxide of titanium and zirconium comprising 50% by weight of titanium oxide and 46% by weight of zirconium oxide.

Example 1

Example 1 has the following structure:
glass/TZO[53 nm]/SiO$_2$[75 nm]/Cr[45 nm]/
The thicknesses given between the square brackets are geometric thicknesses.

Example 1 exhibited a coating side reflectance of 65% and a color in reflection on the coating side characterized by a L*=84.5, an a*=−0.5 and a b*=−3.0, as well as a coating side reflectance of 73% and a color in reflection on the coating side characterized by a L*=88.5, an a*=−4.5 and a b*=0.1. Furthermore it exhibited a transmittance of 1.0%.

Example 2

Example 2 has the following structure:
glass/TZO[53 nm]/SiO$_2$[75 nm]/Cr[35 nm]/SiO$_2$ [27 nm]/

It exhibited a coating side reflectance of 55.3% and a color in reflection on the coating side characterized by a L*=79.2, an a*=−0.7 and a b*=0.3, as well as a glass side reflectance of 72.8% and a color in reflection on the glass side characterized by a L*=88.4, an a*=−4.8 and a b*=0.1. Furthermore it exhibited a transmittance of 2.0%.

The levels of glass side reflection and transmission showed almost no change after heat treatment, that is the variations were always below 2%.

Example 3

Example 3 has the following structure:
glass/TZO[95.9 nm]/SiO$_2$[89.1 nm]/TZO[88.3 nm]/Cr[50 nm]/

It exhibited a coating side reflectance of 64.9% and a color in reflection on the coating side characterized by a L*=84.5, an a*=−0.5 and a b*=−3, as well as a glass side reflectance of 66.6% and a color in reflection on the glass side characterized by a L*=85.2, an a*=−2.2 and a b*=3.1. Furthermore it exhibited a transmittance of 0.7%.

Example 4

Example 4 has the following structure:
glass/TZO[95.9 nm]/SiO$_2$[88.9 nm]/TZO[88.4 nm]/Cr[50 nm]/SiO$_2$[15 nm]/

It exhibited a coating side reflectance of 61.8% and a color in reflection on the coating side characterized by a L*=82.9, an a*=−0.5 and a b*=−2, as well as a glass side reflectance of 66.6% and a color in reflection on the glass side characterized by a L*=85.2, an a*=−2.2 and a b*=3.1. Furthermore it exhibited a transmittance of 0.8%.

The levels of glass side reflection and transmission showed almost no change after heat treatment.

Example 5

Example 5 has the following structure:
glass/TZO[95.9 nm]/SiO$_2$[89 nm]/TZO[88.3 nm]/Cr[50 nm]/Si$_3$N$_4$[15 nm]/

It exhibited a coating side reflectance of 55.4% and a color in reflection on the coating side characterized by a L*=79.2, an a*=−0.4 and a b*=1.2, as well as a glass side reflectance of 66.7% and a color in reflection on the glass side characterized by a L*=85.2, an a*=−2.2 and a b*=3.1. Furthermore it exhibited a transmittance of 0.9%.

The levels of glass side reflection and transmission showed almost no change after heat treatment.

Example 6

Example 6 has the following structure:
glass/TZO[98.8 nm]/SiO$_2$[88.8 nm]/TZO[53 nm]/SiO$_2$ [70.7 nm]/Cr[50 nm]/

It exhibited a coating side reflectance of 64.5% and a color in reflection on the coating side characterized by a L*=84.3, an a*=−0.7 and a b*=−2.9, as well as a glass side reflectance of 81.2% and a color in reflection on the glass side characterized by a L*=92.2, an a*=−0.7 and a b*=0.7. Furthermore it exhibited a transmittance of 0.3%.

Example 7

Example 7 has the following structure:
glass/TZO[99 nm]/SiO$_2$[88.6 nm]/TZO[52.9 nm]/SiO$_2$ [71.2 nm]/Cr[50 nm]/SiO$_2$[15 nm]/

It exhibited a coating side reflectance of 61.4% and a color in reflection on the coating side characterized by a L*=82.7, an a*=−0.6 and a b*=−1.9, as well as a glass side reflectance of 81.2% and a color in reflection on the glass side characterized by a L*=92.2, an a*=−0.7 and a b*=0.7. Furthermore it exhibited a transmittance of 0.4%.

The levels of glass side reflection and transmission showed almost no change after heat treatment.

Example 8

Example 8 has the following structure:
glass/TZO[98.8 nm]/SiO$_2$[89.2 nm]/TZO[53 nm]/SiO$_2$ [70.3 nm]/Cr[50 nm]/Si$_3$N$_4$[15 nm]/

It exhibited a coating side reflectance of 55% and a color in reflection on the coating side characterized by a L*=79, an a*=−0.5 and a b*=1.4, as well as a glass side reflectance of 81.3% and a color in reflection on the glass side characterized by a L*=92.2, an a*=−0.7 and a b*=0.7. Furthermore it exhibited a transmittance of 0.4%.

The levels of glass side reflection and transmission showed almost no change after heat treatment.

Example 9

Example 9 has the following structure:
glass/TZO[100 nm]/SiO2[92 nm]/TZO[53 nm]/SiO2[70 nm]/Cr[35 nm]/SiO2 [27 nm]/

It exhibited a coating side reflectance of 55.9% and a color in reflection on the coating side characterized by an L*=79.6, an a*=−0.7 and a b*=−0.1, as well as a glass side reflectance of 80.2% and a color in reflection on the glass side characterized by an L*=91.7, an a*=−0.36 and a b*=0.14. Furthermore it exhibited a transmittance of 0.92% even at a lower Cr layer thickness of 35 nm.

The levels of glass side reflection and transmission showed almost no change after heat treatment.

Example 10

Example 10 has the following structure:
glass/TZO[115 nm]/SiO$_2$[64.3 nm]/TZO[66.5 nm]/SiO$_2$ [30.8 nm]/Cr[50 nm]/SiO$_2$[20 nm]/

It exhibited a coating side reflectance of 60% and a color in reflection on the coating side characterized by a L*=, an a*= and a b*=, as well as a glass side reflectance of 77.7% and a color in reflection on the glass side characterized by a L*=90.7, an a*=0.1 and a b*=1.0. Furthermore it exhibited a transmittance of 0.5%.

In particular it was surprisingly observed that this stack had a particularly neutral color of glass side reflectance measured at 55° with a*=−0.8 and b*=−0.7

The levels of glass side reflection and transmission showed almost no change after heat treatment.

Example 11

Example 11 has the following structure:
glass/TZO[96.4 nm]/SiO$_2$[81.1 nm]/TZO[50.9 nm]/SiO$_2$ [90.6 nm]/Cr[35 nm]/TZO[34.8 nm]/SiO$_2$[77.6 nm]/ TZO[47.1 nm]/SiO$_2$[76.7 nm]/TZO[47 nm]/

It exhibited a coating side reflectance of 68.8% and a color in reflection on the coating side characterized by a L*=85.7, an a*=5.2 and a b*=6.7, as well as a glass side reflectance of 80% and a color in reflection on the glass side characterized by a L*=91.6, an a*=0.4 and a b*=0.1. Furthermore it exhibited a transmittance of 1%.

Comparative Example C1

Comparative example C1 has the following structure:
glass/TZO[93.8 nm]/SiO$_2$[81.6 nm]/TZO[49.2 nm]/

It exhibited a coating side reflectance of 52.6% and a color in reflection on the coating side characterized by a L*=77.2, an a*=1.7 and a b*=9.7, as well as a glass side reflectance of 50.4% and a color in reflection on the glass side characterized by a L*=75.9, an a*=0.3 and a b*=9.8. Furthermore it exhibited a transmittance of 46.4%. Thus C1, despite having a high reflectance on both sides does not form an opaque mirror.

Comparative Example C2

Comparative example C2 has the following structure:
glass/TZO[100.3 nm]/SiO$_2$[89.1 nm]/TZO[52.7 nm]/ SiO$_2$[88.8 nm]/TZO[53 nm]/

It exhibited a coating side reflectance of 73.1% and a color in reflection on the coating side characterized by a L*=88.4, an a*=−1.1 and a b*=2, as well as a glass side reflectance of 70% and a color in reflection on the glass side characterized by a L*=86.9, an a*=−2.7 and a b*=2.4. Furthermore it exhibited a transmittance of 26.2%. Thus C2, despite having a high reflectance on both sides does not form an opaque mirror. Furthermore C2 relies on achieving a high level of reflectance by using three high refractive index layers of TZO which are known to have low deposition rates. This leads to increasing the production costs of such a layer stack.

Comparative Example C3

Comparative example C3 has the following structure:
glass/NbO$_x$[105 nm]/SiO$_2$[88 nm]/NbO$_x$[53 nm]/SiO$_2$[88 nm]/NbO$_x$[53 nm]/

It exhibited a coating side reflectance of 68% and a color in reflection on the coating side characterized by a L*=85.8%, an a*=−1.28 and a b*=0.01, as well as a glass side reflectance of 70% and a color in reflection on the glass side characterized by a L*=86.9, an a*=−0.04 and a b*=−0.08. Furthermore it exhibited a transmittance of 30%. Thus C3, despite having a high reflectance on both sides does not form an opaque mirror. Furthermore C3 relies on achieving a high level of reflectance by using three high refractive index layers of NbOx which are known to have low deposition rates. This leads to increasing the production costs of such a layer stack.

Comparative Example C4

Comparative example C4 has the following structure:
glass/NbO$_x$[102 nm]/SiO$_2$[95 nm]/NbO$_x$[52 nm]/NiCr[10 nm]/SiO$_2$[49 nm]/NbO$_x$[65 nm]/NiCr was sputtered from a typical NiCr alloy sputtering target having about 80% in weight of nickel and about 20% in weight of chromium. It exhibited a coating side reflectance of 73% and a glass side reflectance of 30% and a transmittance of 18-20%. Thus C4, despite having a high reflectance on the glass side, does still not form an opaque mirror. Furthermore C4 relies on achieving an asymmetric level of reflectance by using three high refractive index layers of NbO$_x$ which are known to have low deposition rates, as well as a NiCr layer. This leads to increasing the production costs of such a layer stack.

DURABILITY TESTS

Examples 1-11 all passed 20 days of CASS test, 20 days of NSS test, 20 days of COND test and 15 days of CLEV test.

Samples of comparative example C4 failed after at most 5 days in the CASS test.

Examples 1-11 also passed 1000 cycles the DBT test and 500 cycles in the FT test.

A heat treatment was performed on examples of the present invention by heating them in a static furnace at 670° C. for 4 minutes. These heat treatment parameters simulate the heat load of thermal tempering. For examples 2, 4, 5, 7, 8, 9, 10, and 11 transmission TL remained below 2% even after the heat treatment. Both glass side reflectance and coated side reflectance do not vary by more than 3-5%. For examples 1, 3, and 6, after heat treatment, the glass side reflectance also does not vary by more than 3-5% and transmission remains below 2%, but coating side reflectance varies by 30% or more.

The invention claimed is:

1. A substrate coated with a stack of layers comprising, in order, at least:
   i. a transparent substrate (S);
   ii. a first dielectric layer consisting essentially of Ti$_x$Zr$_y$O$_z$ (TZO), wherein x, y and z are each a number greater than 0, which is a high refractive index dielectric layer (H1) with a refractive index n at a wavelength of 550 nm between 2.1 and 2.8;
   iii. a second dielectric layer having an optical thickness of from 95 nm to 200 nm which is a low refractive index dielectric layer (L1) with a refractive index n at a wavelength of 550 nm between 1.4 and 1.8;
   iv. optionally, a third dielectric layer consisting essentially of TZO; and
   v. a single layer (C) consisting essentially of chromium, wherein a glass-side light reflectance is greater than 50% and a coating-side light reflectance is greater than 50%,
      wherein the first dielectric layer is in direct contact with the transparent substrate,
      wherein when the third dielectric layer (H2) is present, the optical thickness of the third dielectric layer (H2) is 95% or less of the optical thickness of the first dielectric layer, and
      wherein the coated substrate has a light transmission of at most 2%, and
      the coated substrate is thermally temperable such that after a heat treatment in a static furnace at 670° for four minutes the light transmission remains at most 2%.

2. The coated substrate of claim 1, comprising the third dielectric layer (H2) arranged in between the second dielectric layer (L) and the single layer (C) consisting essentially of chromium.

3. The coated substrate of claim 2, further comprising a fourth dielectric layer (L2) which is a low refractive index dielectric layer arranged in between the third dielectric layer (H2) and the single layer (C) consisting essentially of chromium.

4. The coated substrate of claim 1, wherein the low refractive index dielectric layer (L1) comprises at least one material selected from the group consisting of a silicon oxide and an aluminum oxide.

5. The coated substrate of claim 1, wherein the low refractive index dielectric layer (L1) comprises an oxide of silicon.

6. The coated substrate of claim 1, wherein the second dielectric layer (L) consists essentially of $SiO_x$, with x between 1.6 and 2.1.

7. The coated substrate of claim 1, comprising:
the third dielectric layer (H2) arranged in between the second dielectric layer (L1) and the single layer (C) consisting essentially of chromium, and further comprising:
a fourth dielectric layer (L2) which is a low refractive index dielectric layer arranged in between the third dielectric layer (H2) and the single layer (C) consisting essentially of chromium,
wherein the fourth dielectric layer (L2) consists essentially of $SiO_x$, with x between 1.6 and 2.1.

8. The coated substrate of claim 1, wherein a geometric thickness of the single layer (C) consisting essentially of chromium is between 15 and 70 nm.

9. The coated substrate of claim 1, wherein an optical thickness of the first dielectric layer (H1) is between 100 and 300 nm.

10. The coated substrate of claim 1, comprising the third dielectric layer (H2) arranged in between the second dielectric layer (L1) and the single layer (C) consisting essentially of chromium, wherein an optical thickness of the third dielectric layer (H2) is between 90 and 250 nm.

11. The coated substrate of claim 1, comprising:
the third dielectric layer (H2) arranged in between the second dielectric layer (L1) and the single layer (C) consisting essentially of chromium, and further comprising:
a fourth dielectric layer (L2) which is a low refractive index dielectric layer arranged in between the third dielectric layer (H2) and the single layer (C) consisting essentially of chromium,
wherein an optical thickness of the fourth dielectric layer (L2) is between 90 and 200 nm.

12. The coated substrate of claim 1, wherein the first and second dielectric layers (H1 and L1) are in direct contact with each other.

13. The coated substrate of claim 1, comprising:
the third dielectric layer (H2) arranged in between the second dielectric layer (L1) and the single layer (C) consisting essentially of chromium, and further comprising:
a fourth dielectric layer (L2) which is a low refractive index dielectric layer arranged in between the third dielectric layer (H2) and the single chromium based layer (C) consisting essentially of chromium,
wherein the third dielectric layer (H2) is in direct contact with the second dielectric layer (L1).

14. The coated substrate of claim 1, comprising:
the third dielectric layer (H2) arranged in between the second dielectric layer (L1) and the single layer (C) consisting essentially of chromium, and further comprising:
a fourth dielectric layer (L2) which is a low refractive index dielectric layer arranged in between the third dielectric layer (H2) and the single layer (C) consisting essentially of chromium,
wherein the fourth dielectric layer (L2) is in direct contact with the third dielectric layer (H2).

15. The coated substrate of claim 1, further comprising, as a last layer, a protective layer (P) which comprises at least one material selected from the group consisting of a silicon oxide, an aluminum oxide, a silicon nitride, and an aluminum nitride.

16. The coated substrate of claim 15, wherein the protective layer (P) has a geometric thickness between 5 and 40 nm.

17. The coated substrate of claim 1, having a glass-side light reflectance of at least 70%.

18. The coated substrate of claim 1, wherein the coated substrate on a glass side has CIELAB a* and b* color coordinates values such that $-5<a^*<5$ and $-6<b^*<6$.

* * * * *